(12) United States Patent
Anderson

(10) Patent No.: US 6,768,604 B2
(45) Date of Patent: Jul. 27, 2004

(54) METHOD FOR REDUCTION OF OFF-TRACK ERRORS IN DATA STORAGE TAPE SYSTEMS

(75) Inventor: James C. Anderson, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 278 days.

(21) Appl. No.: 09/883,020

(22) Filed: Jun. 14, 2001

(65) Prior Publication Data

US 2002/0191321 A1 Dec. 19, 2002

(51) Int. Cl.$^7$ ............................ G11B 15/04; G11B 21/02
(52) U.S. Cl. ................. 360/60; 360/73.06; 360/73.07; 360/77.12; 360/77.01; 360/75
(58) Field of Search ............................ 360/77.12, 73.04, 360/73.05, 73.06, 73.08, 74.1, 74.4, 77.01, 75, 53, 60

(56) References Cited

U.S. PATENT DOCUMENTS

| | | | |
|---|---|---|---|
| 5,182,682 A | * 1/1993 | Weispfenning et al. | 360/77.08 |
| 5,268,800 A | * 12/1993 | Nielsen | 360/77.01 |
| 5,612,845 A | * 3/1997 | Smith | 360/137 |
| 5,764,430 A | 6/1998 | Ottesen | 360/73.03 |
| 5,892,633 A | 4/1999 | Ayres | 360/73.08 |
| 5,898,534 A | 4/1999 | Gray | 360/77.01 |
| 5,995,317 A | 11/1999 | Ottesen | 360/77.04 |
| 6,049,441 A | 4/2000 | Ottesen | 360/77.04 |
| 6,067,203 A | 5/2000 | Ottesen | 360/73.03 |
| 6,101,060 A | * 8/2000 | Wojciechowski et al. | 360/70 |
| 6,130,792 A | * 10/2000 | Goker | 360/48 |
| 6,172,835 B1 | 1/2001 | Nonoyama | 360/73.08 |
| 6,265,868 B1 | * 7/2001 | Richter | 324/212 |

OTHER PUBLICATIONS

Partial printout of http://www.Itotechnology.com/about.html website, dated Mar. 8, 2001.

* cited by examiner

*Primary Examiner*—David Hudspeth
*Assistant Examiner*—Glenda P Rodriguez

(57) ABSTRACT

Embodiments of a data storage tape control system are disclosed that works to prevent or reduce frequency of off-track errors. The invented method slows tape speed in response to the writing head or writing element moving transversely away from a track center a predetermined distance, called an "off-center limit," wherein the off-center limit is part of the way to an off-track error limit. The off-center limit is close enough to the center of the track that the writing operation is still effective, but wherein further movement out from the center would result in an off-track error and possible overwriting or unreadable data. The tape speed reduction is preferably done in increments until the writing head/element is closer to the center of the track than the off-center limit. Speed reduction is preferably done concurrently with writing, so that writing is not interrupted. Although the tape speed is reduced, the overall efficiency of writing may be increased compared to an operation in which off-track errors and writing failures occur repeatedly, at least in part because of high tape speeds.

16 Claims, 4 Drawing Sheets

METHOD FOR REDUCTION OF OFF-TRACK ERRORS IN DATA STORAGE TAPE SYSTEMS

FIELD OF THE INVENTION

This invention relates generally to tape systems for data storage and retrieval. More specifically, the invention relates to methods of improving data storage, and, specifically, the writing operation. The invention provides methods for minimizing off-track errors by monitoring the magnitude and/or timing of events that may possibly lead to off-track errors and taking corrective action.

BACKGROUND OF THE INVENTION

Various computer data storage tape systems are well known. Tape systems are commonly used for data protection backup of computer files, and for dumping entire hard drive contents to a tape for backup and archiving. One category of such systems is the linear tape system, a subset of which subscribes to the "LTO standards" (Linear Tape Organization standards). The LTO standards define requirements for hardware and software to enable universal use of standard tapes on LTO equipment produced by various manufacturers.

Schematics and information describing LTO technology are available in patent literature and at the website Itotechnology.com. A conventional LTO system is schematically portrayed in FIG. 1. LTO tape 10 is approximately ½ inch in width. Eight channel LTO tape has 384 tracks, readable and writeable by a head 12 with eight read/write elements 14. The eight read/write elements 14 in a conventional LTO system may simultaneously write or read eight tracks at a time all along the length of the tape 10, which is typically 600 meters long. After reaching the end of the tape 10, the head 12 is moved slightly, and the tape 10 is run in reverse. The position of the head 12 on the tape 10 is controlled in relationship to servo bands 16 on the tape that each contains six sub-bands. Also, the head 12 has two possible positions for each of the sub-bands within each of the servo bands. As a result, the tape has a total of (8×4×6×2)=384 tracks for reading and writing.

Conventional linear tape systems have a maximum write and read speed, typically in the range of 2–8 meters/second (m/s), and, in the preferred embodiment herein, about 4.1 m/s. The linear tape travels at this speed through guides between two spools. Due to external vibrations, internal inconsistencies in tape, spool, or guide manufacture, and inconsistencies in the wrapping of tape around itself on the spool, the tape sometimes wanders transversely, relative to the writing head, so that centers of the tracks move transversely relative to the writing elements, that is, perpendicular to the length of the tape. This is called "going off-track." These off-track events typically repeat themselves and frequently grow to a magnitude that results, if writing continues, in overwriting of another track or in the data not being found when it is to be read. Most conventional tape systems, therefore, are designed to react quickly when there is an "off-track error," that is, when the head reaches an "off-track limit." This off-track limit is predetermined, by the manufacturer/programmer, to be the limit between the area in which writing may be done properly and the area in which writing is not acceptable because of the possibility/probability of overwriting or unreadable writing. The off-track limit, in terms of microns transversely off of center-track, is set at different locations by various manufacturers, and is preferably a single off-track limit on each side of center in the range of about 10–20% of the track width. For a track having a 28-micron width, the off-track error limit may be set, for example, at about 3 microns, or another limit within the preferred 10–20% range.

The off-track sensing system of a conventional tape system cooperates with the closed-loop head-positioning servo control system. The head monitors its position relative to the servo bands, and so, in effect, monitors the position of the writing elements relative to the centers of the tracks. When the head reaches the off-track limit, meaning that the individual elements are off-track relative to their respective track centers, an error is signaled. The conventional tape system controller then turns off the writing function while the tape continues to travel at full speed, and waits until the head is back "on track," that is, within the acceptable position limits. Once the sensing system indicates that there is no longer an off-track error, writing is started again.

Each time an off-track error occurs, the process is repeated. If there are tape, tape spool, or vibration problems inherent in the tape system or in the environment in which the writing is being done, off-track errors may repeat frequently. Many off-track errors are caused by problems in the tape path such as the tape scuffing the reel flanges or bumps in the tape pack on the spool(s). These types of position error signal (PES) events occur at the rotational speed of one of the reels and the magnitude of the off-track error is very similar for each rotation. This type of off-track error, therefore, tends to repeat itself on each reel revolution, or at least very frequently, and, each time the error occurs, the process for "retries" of writing, sometimes called the "Write With Off-Track" (WWOT) process, is repeated. The conventional tape system repeatedly shuts off the writing function, advances the tape until the off-track error ends, and starts writing again until another off-track signal occurs, all at full speed. If the off-track errors continue to interrupt writing for an extended period of time, the tape may travel a long distance without significant amounts of successful writing. Optionally, conventional retries may include repositioning the tape, that is, reversing the tape to back-up to a position on the tape where writing stopped, but such methods add complexity and waste time. To prevent endless unsuccessful attempts at writing, the conventional tape controller stops this process if a certain amount of writing has not been done successfully within a certain length of tape. Typically, if a data-set of typically 100–115 mm of data is not written in a total of 4 meters of tape, the controller will stop the process, without any more attempts, and signal a writing failure. The result of such off-track errors and the conventional WWOT process, therefore, reduces tape storage capacity and wastes time, and, occasionally, results in write failures.

Some tape speed control systems for linear tape have been developed that may adjust tape speed in order to match the speed of data coming from the host computer. Such systems prevent frequent stops and starts of the tape writing process when the tape speed is ahead of the data delivery speed from the host computer. In systems using such a host-matching speed control system, the speed at which writing, tape advancement, and retries are conventionally conducted may be the speed that is set in response to the host data transfer rate. In such systems, therefore, "full speed" may not be the system's highest possible speed, but rather the highest speed that is compatible with the host computer's operation. In the Figures and hereafter, the term "full speed" is used to denote either the maximum tape speed that is possible, or the maximum speed that is compatible with the host computer in systems that adjust speed to be compatible with the host computer. Patents that discuss speed control include U.S. Pat. No. 5,892,633 (Ayres, et al.); U.S. Pat. No. 5,764,430 (Ottesen, et al.); and U.S. Pat. No. 6,067,203 (Ottesen, et al.).

Still, there is a need for improved tape writing and reading performance. There is a need for reduction of off-track errors and write failures. The present invention addresses these needs.

SUMMARY OF THE INVENTION

The present invention comprises a method of reducing off-track errors in data storage tape systems. The present invention reduces tape speed in response to movement of the writing head/element off of the center of the track, prior to the writing head/element reaching an off-track error position. The present invention, therefore, preferably utilizes a double-limit system of an off-center limit in addition to an off-track limit, as a preventive measure to reduce off-track errors, write failures, and waste of time and tape. It is believed that speed reduction lessens the effect of such events as tape hitting a reel or bumps forming in the roll of tape, and, in doing so, lessens transverse relative movement of the tape and the writing head. Therefore, speed reduction helps the head positioning servo system improve control of the writing head position, and, thereby, helps prevent WWOT errors from occurring, especially the type of WWOT errors that start with off-center events growing in severity with every rotation of a tape reel. Preferably, the servo system position error signal (PES) is used to control the speed of the tape, in response to relative transverse movement of the head to a predetermined and preprogrammed off-center limit on either side of the track center, which is closer to the track center than the conventional off-track limits. Overall, the present invention tends to increase successful writing and to reduce failed writing.

DETAILED DESCRIPTION OF THE INVENTION

Figure 1:
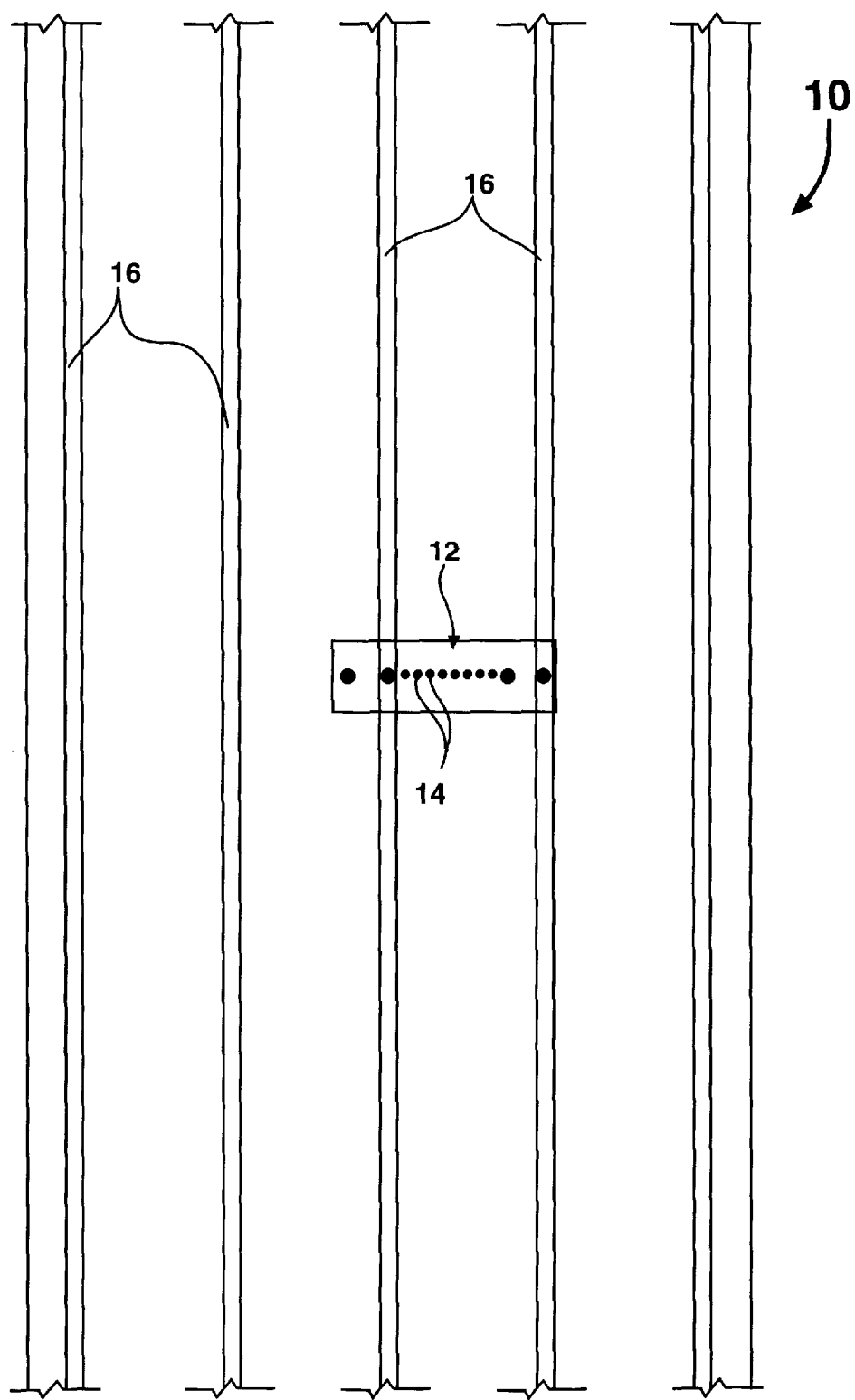
FIG. 1 is a schematic plan view of a portion of a prior art linear tape with a writing head positioned over the tape to write on eight tracks with its eight writing elements.
Figure 2:
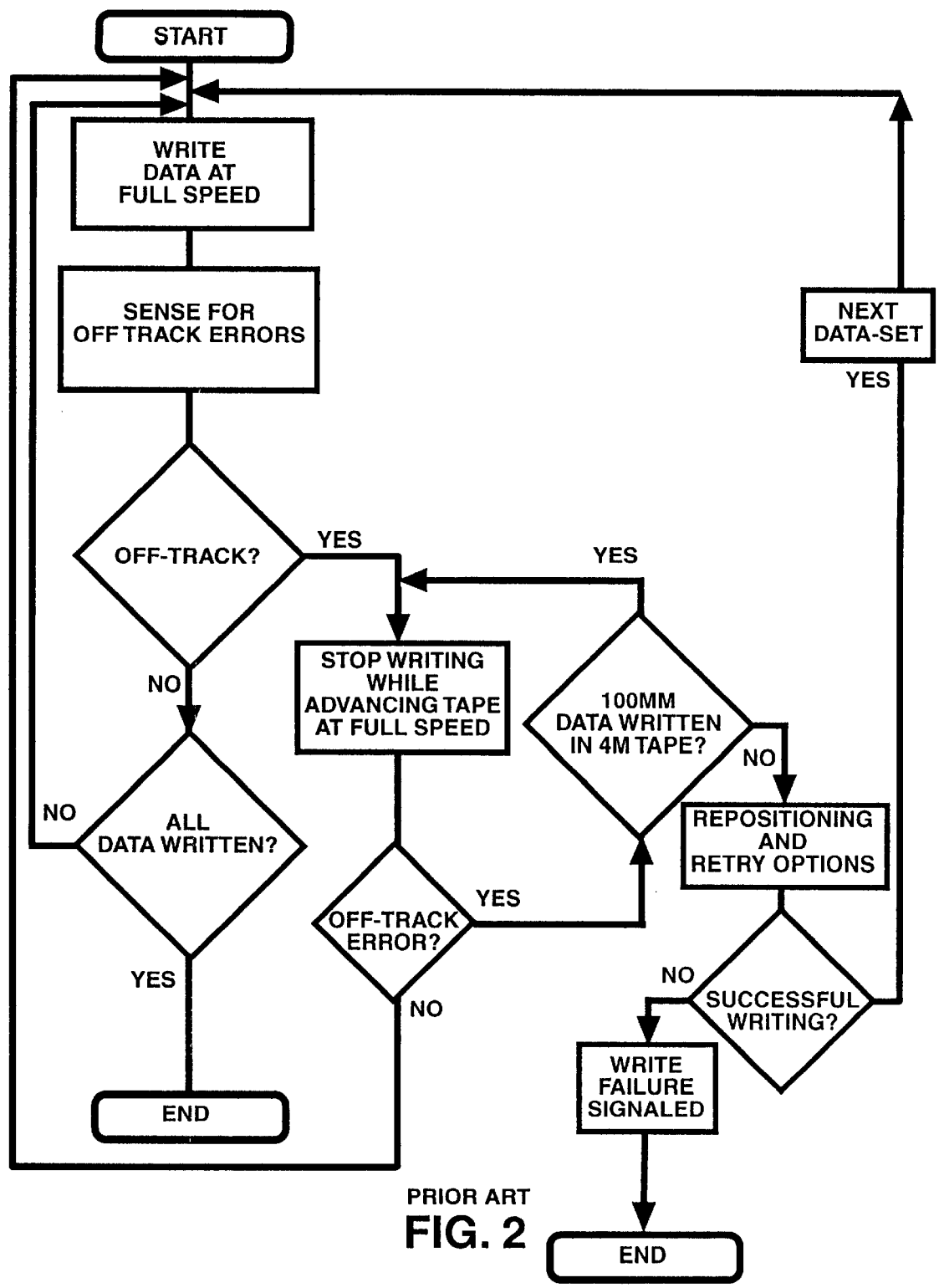
FIG. 2 is a schematic flow diagram of steps in a conventional tape system control scheme for response to off-track errors.
Figure 3A:
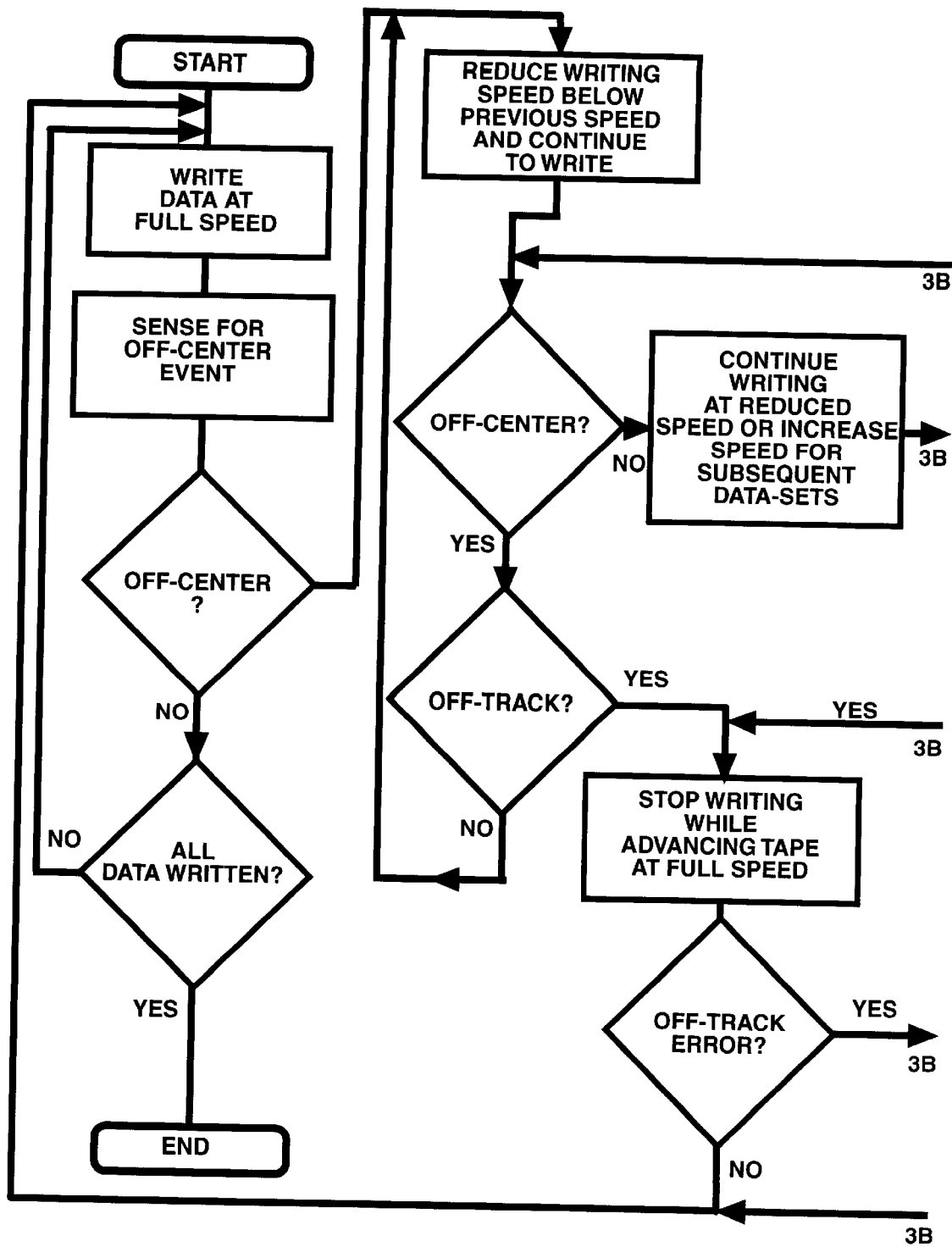
FIGS. 3A and 3B are each schematic partial flow diagrams, which connect as indicated to form a single flow diagram, of one embodiment of the invention for reduction of off-track errors in data storage tape systems, wherein tape speed is lowered in response to the head reaching an off-center limit before it reaches an off-track limit.
Figure 3B:
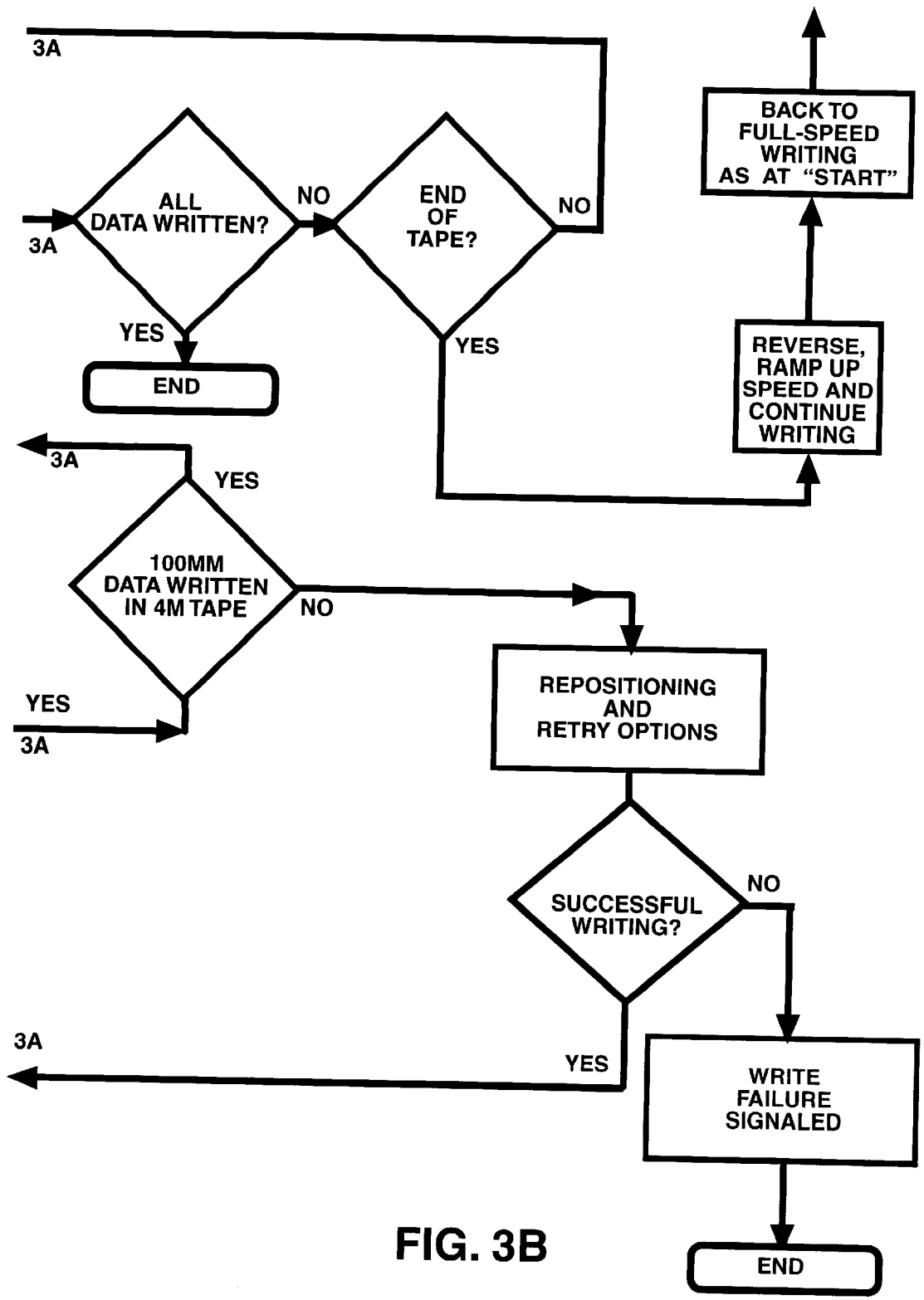

Referring to the drawings, there are shown several, but not the only, embodiments of the invented method for reduction of off-track errors or write failures in data storage tape systems. FIGS. 1 and 2 illustrate prior art tape equipment and controller methods. FIGS. 3A and 3B illustrate one embodiment of the invented method.

As discussed in the Background of the Invention section, the prior art systems stop writing when an off-track error occurs and continue tape advancement until the off-track error corrects itself and writing is resumed, all without speed adjustment. With the prior art method, no real off-track error correction steps are taken, and the tape controller, in effect, assumes the error will go away so that writing can resume. Because no error correction steps are taken, off-track errors in conventional systems frequently repeat themselves and result in write failures or wasted tape.

Referring to the prior art method shown in FIG. 2, writing starts at full speed, while the off-track sensing system continuously checks for off-track errors. If no off-track error is sensed, writing continues until all data are written, and the writing job ends. If off-track errors are sensed, writing is stopped while the tape continues to travel and the error sensing system continues to check for the head reaching the off-track error limit. When an off-track error is corrected, writing is started again, but the system is still prone to off-track errors for the reasons that caused the initial error occurrence(s). If the off-track error persists with less than one data-set written in a prescribed length of tape, a write failure is signaled and the write job ends, unfinished. Alternatively, prior to signaling a write failure, repositioning and/or other retry techniques may be attempted as a means to attain successful writing.

Referring to FIGS. 3A and 3B, the present invention comprises methods, and may also comprise the equipment and programming for accomplishing the methods of helping prevent off-track errors and/or writing failures, that is, computer program products comprising computer usable medium of various types having computer readable program code means embodying the methods described herein.

For the purposes of this description and the claims, "on-center" means the head is at the optimum position so that its elements are on their respective tracks, which typically means that writing is being done with the elements centered on the tracks. The term "off-track" means an event in which the writing head/element is transversely displaced from its optimum on-center writing position to an extent that is determined to be at or near the point where writing is unadvisable. An "off-track error," therefore, is a situation in which the head relative to the tape is greater than, or equal to, a predetermined off-track limit from the elements' on-center position. "Off-center" means an event in which the writing head is transversely displaced from its optimum on-center writing position, but not to an extent that is at or near the point where writing is unadvisable. An "off-center" event, therefore, is a situation in which the head relative to the tape is between the on-center position and the off-track error position. An "off-center limit" is the predetermined distance from the on-center position where corrective action is taken to help prevent excursions further off-center, and the "off-center limit" is preferably measured in microns.

The present invention measures writing head position relative to the tape, preferably using a conventional servo band—PES system. According to the invented method, when the PES indicates a writing head position, corresponding to element(s) being off of the center of the track(s), that is at or greater than the off-center limit, but not yet reaching the seriousness of an off-track error, the tape speed controller slows the tape speed a predetermined amount, preferably while writing continues. The slower speed typically either: 1) helps reduce or eliminate the off-center event, or 2) reduces or eliminates the escalation of the off-center event to an off-track error. Because of the repetitive nature of many off-center events occurring with reel rotation, as discussed above, tape speed reduction is likely to control off-center events at a magnitude where writing is still successful. Thus, corrective measures are taken at or near the start of a potential problem, rather than waiting until an off-track error has developed. Because writing typically does not need to be stopped, and writing retries are not necessary, the invented preventative method is likely to improve the overall transfer rate of data to the tape even though the tape speed may be lower. This also reduces the loss of storage capacity on the tape.

The off-track limits and off-center limits, according to the invention, are set on both sides of the track center, so that relative transverse wandering in either direction will cause the desired responses. Off-track limits are typically set at about 10–20% of track width, but may set at other distances. Off-center limits are set at a fraction of the off-track limits, preferably about 50–80% of the off-track limit, and more preferably about 60–75%. Thus, if an off-track limit is set at 5 $\mu$m, then an off-center limit that is 60% of the off-track limit would be set at 3 $\mu$m, and an off-center limit that is 75% of the off-track limit would be set at 3.75 $\mu$m. Setting the off-center limit at higher than about 80% of the off-track limit would probably result in little/infrequent preventive actions, as speed would not be reduced until writing conditions were already very close to an off-track error. Setting the off-center limit at lower than about 50% of the off-track limit would probably result in an unnecessarily sensitive system, slowing data transfer and writing more than necessary due to frequent off-center signals.

An example system, working according to the invention, has predetermined off-center limits of 3 $\mu$m, at which corrective action is taken. The example system has predetermined off-track limits of 4.5 $\mu$m, at which an off-track error is signaled and writing is stopped. Operation according to the invented method begins when data writing is progressing in the example system at the normal maximum tape speed, for example, 4.1 m/s. An off-center event begins to happen at a frequency of once-around-the-reel. Whereas on-center operation results generally in a PES of zero or very close to zero, the off-center event begins to cause small positive PES peaks at first, generally increasing in magnitude with every revolution. The magnitude of the off-center event continues to grow until PES reaches the predetermined off-center limit. The off-center limit is a value at which the head is still writing data acceptably, that is, not close to overwriting another track and not where the writing will be un-readable. When the PES peak reaches the predetermined off-center limit, the tape controller reduces tape speed a predetermined amount, for example, from 4.1 m/s to 3.6 m/s, or to another speed determined to make a significant difference in performance. If the PES does not decrease below the off-center limit after a set short time (for example, 2 reel revolutions), then another tape speed reduction is made, for example, by another increment of 0.5 m/s, and so forth, until the PES decreases below the off-center limit. Various programmed schedules may be used for reducing tape speed, for example (but not necessarily) as a function of frequency of PES peak, magnitude of PES peak, time expected for an off-center event to subside, position along long axis of tape, etc. Thus, the final, successful writing speed of the system of FIGS. 3A and 3B preferably may be anywhere in the range between the maximum writing speed and the minimum writing speed, which are 4/1 m/s and 1.6 m/s, respectively, in this example.

If tape speed reduction successfully maintains the PES peak at or below the off-center limit until certain conditions are met, tape speed is preferably increased, so that writing may again progress at a faster rate. These "certain conditions" may be chosen to optimize writing operation, for example: 1) that the PES has been less than the off-center limits for a predetermined amount of time or a predetermined number of reel revolutions, 2) that a certain number of data-sets has been written without another off-center event, 3) that a certain length of tape has been used in slower speed writing without another off-center event, or 4) that the end of the tape has been reached and the tape is being reversed. A combination of conditions may be set, for example, speed increase may start when a certain time has passed without an off-center limit or when the tape has reached its end, whichever happens first. Speed increase after a tape reversal is done under the assumption that the problem in tape position/wrapping, which causes the off-center event, is normally corrected or changed when the tape reverses.

The system is preferably programmed to increase tape speed at a slow rate or in gradual increments ("ramping" up the speed), after the certain condition(s) are met. The inventor believes that the slow/incremental speed increase will result in increased writing efficiency without unreasonably risking off-track errors. For example, after responding to an off-center event according to the invention, rather than continuing at low speed for an extended amount of time and rather than "racing" the tape speed back up to full speed, it is more efficient to slowly increase speed, for example, at increments of 0.5 m/s, as long as off-center events do not resume. The inventor believes that, in many cases, a speed increase is appropriate after the invented response to an off-center event, because significantly more writing can take place before the next off-center event, and a slow speed increase helps prevent the next off-center event from escalating into an off-track error.

FIGS. 3A and 3B illustrate some, but not the only, options for speed-increase schedules that would be available to one of skill in the art after reviewing this description of the invention. FIGS. 3A and 3B indicate that, after speed reduction is done because of an off-center event and after operation is no longer off-center, tape speed may be maintained at the reduced speed or may be increased (for example, for subsequent data-sets), and that tape speed may also be ramped up after reaching the tape end and reversing the tape.

The invented process, therefore, may be repeated many times as needed, that is, off-center event followed by reduction in tape speed, and then, after certain conditions are met, speed increase until another off-center event occurs and, then, another tape speed reduction, etc. If off-center events do not recur, then the tape speed increase may continue until the maximum is reached, for example, 4.1 m/s.

Tape speed reduction/ramping may be programmed as preferred by the manufacturer. For example, incremental speed reductions of any desired amount may be used, but preferably they are on the order of 0.3–1.0 m/s reductions, in order to quickly correct a situation. Alternatively, continuous tape speed reduction may be utilized, until the tape speed is at its minimum, or, alternatively, until a desired effect is realized, for example, a 1 $\mu$m decrease in PES and maintenance of that maximum PES for a set amount of time, such as 1–2 seconds.

The invented process is repeated throughout the writing job, until either: 1) all the data is written and the writing job ends successfully, or 2) an off-center event cannot be controlled by tape speed reduction, even when the tape speed has been incrementally or continuously reduced to a low speed, for example, half or less of the maximum speed. In the event that off-center control is not successful by the invented method of preventative speed reduction, then the tape system may default to the other off-track error handling processes, for example, the conventional method shown in FIG. 2.

In the especially-preferred embodiment, tape speed reduction is done while writing continues, without any interruption of the writing job. Because an off-center limit, according to the invention, does not signal an area in which writing is unadvisable or unacceptable, writing preferably continues during tape speed adjustment. In alternative embodiments, writing is very briefly interrupted when tape speed is being reduced by an incremental amount, for only the amount of time it takes to reach the new, lower tape speed, which would be on the order of about a second or less.

The invented methods may also be used to provide more margin during external operating vibration of the product. For example, the environment of the tape system may be a difficult one, with vibrations caused by a less-than-stable surface under the tape system/computer. In such a case, the invented methods essentially shift margin from the tape wander "budget" (expected movement due to tape and reel manufacturing inconsistencies) into the operating vibration "budget" (expected movement due to environmentally-caused vibration) by slowing the speed of the tape. Thus, a conventionally-controlled tape system might respond adequately to off-track errors caused by manufacturing inconsistencies, but will be overwhelmed by additional external vibrations and enter frequent writing retries and write failures. With the invented methods, the tape speed is reduced to prevent most of the off-track errors, so that external vibrations added on top of manufacturing flaws do not cause repeated write failures.

Technology for adjusting tape speed is known in the art, although the prior art technology is meant for adjusting tape speed to match the speed of data being made available by the host computer. Conventional tape speed control hardware and programming known to those of skill in the art may be adapted, once this invention disclosure is seen and understood, to accomplish the invented methods of speed adjustment in response to off-center signals. Incremental speed adjustment is preferred, while writing continues, but other speed adjustment techniques may also be used.

The invention provides ways to prevent or reduce off-track errors in linear tape writing, with a minimum effect on transfer time for the data onto the tape. By taking action to correct an off-center event before it escalates into an off-track error, writing does not normally need to be stopped, and the chances of successful writing, in a minimum amount of time and with minimum off-track errors, is greatly enhanced. By starting correction early and then by continuing to take additional corrective action on any subsequent off-center events, many write jobs may be done without the off-rack errors that result in inefficient tape usage, slow data storage, and incomplete/failed writing jobs. The invented method tends to be more efficient than the prior art, even though average tape speed may be lower, because fewer stops, starts, and retries are needed and fewer write failures are experienced.

In the description and claims, "writing head . . . being off-center" means that the writing head or some writing element in the writing head is off-center relative to its pre-determined center position. The "center position" is where each element is at the middle of its respective track, and is typically determined by sensing of the head relative to servo bands. Because the elements are fixed in their position relative to each other and to the portion of the head sensing the servo bands, an off-center event "for the head" equates to an off-center event for an element.

Although this invention has been described above with reference to particular means, materials and embodiments, it is to be understood that the invention is not limited to these disclosed particulars, but extends instead to all equivalents within the scope of the following claims.

I claim:

1. A method of reducing off-track errors in a data storage linear tape writing operation by changing writing operation prior to an off-track error occurring, the method comprising:

writing data longitudinally onto a tape with a writing head while the tape is moving longitudinally at a base tape speed;

sensing position of the writing head relative to a longitudinal track center on the tape;

providing off-center limits on each side of the longitudinal track center, each off-center limit being a transverse distance from the track center;

providing off-track limits, at which writing is stopped, on each side of the track center, each off-track limit being a distance from the track center that is transversely farther from the track center than said off-center limits; and reducing tape speed below the base tape speed when the writing head reaches either of the off-center limits.

2. The method as in claim 1, further comprising continuing to sense position of the writing head relative to said track center after reducing tape speed, and, if the writing head doe not move closer to said track center than the off-center limits, reducing tape speed a second time.

3. A method as in claim 2, comprising, prior to reducing tape speed a second time, sensing position of the writing head relative to the off-track limits, and if the writing head has reached either of the off-track limits, stopping writing and continuing to advance the tape.

4. A method as in claim 1, wherein the writing head moves closer to said track center than the off-center limits after said reducing of tape speed, and the method further comprising ramping up tape speed, after the writing head moves closer to said track center, until the first of either the tape speed reaching said base tape speed or the writing head reaching either of the off-center limits a second time.

5. A method as in claim 1, wherein the writing head moves closer to said track center than the off-center limits after said reducing of tape speed, and the method further comprising ramping up tape speed, after the writing head moves closer to said center and writing of an entire data-set is completed, said ramping up tape speed continuing until the first of either the tape speed reaching said base tape speed or the writing head reaching either of the off-center limits a second time.

6. The method of claim 1 comprising the off-center limits being set a distance from said track center that is 50–80% of the distance of the off-track limits from said track center.

7. A computer program product for use with a data storage tape system, said computer program product comprising:

computer usable medium having computer readable program code means embodied in said medium for controlling position of a writing head relative to a center of a track on a tape in a data storage tape system wherein the data storage tape system stops writing on the tape when the writing head reaches either of two off-track error limits, one of said two off-track limits being provided on each side of the center of the track;

said computer program product having computer readable program code means for slowing tape speed below a base tape speed when a writing element reaches either of two off-center limits transversely is laced from the center of the track, one of said off-center limits being provided on each side of said center, wherein the two off-center limits are not as distant from the center of the track as are the two off-track error limits.

8. A computer program product as in claim 7, further comprising: computer readable program code means for reducing tape speed a second time if the writing head does not move closer to said center than the off-center limits after reducing tape speed.

9. A computer program product as in claim 8, further comprising:
computer readable program code means for stopping writing and advancing the tape, prior to reducing tape speed a second time, if the writing head reaches either of the off-track limits.

10. A computer program product as in claim 7, further comprising computer readable program code means for ramping tape speed up, after the writing head moves closer to said center, until the first of either the tape speed reaching said base tape speed or the writing head reaching either of the off-center limits a second time.

11. A computer program product as in claim 7, further comprising computer readable program code means for ramping tape speed up, after writing head moves closer to said center of the track than the off-center limits after said reducing of tape speed, and after writing of an entire data-set is completed, said ramping of tape speed being continued until the first of either the tape speed reaching said base tape speed or the writing head reaching either of the off-center limits a second time.

12. The computer program product of claim 7 comprising the off-center limits being set a distance from said track center that is 50–80% of the distance of the off-track limits from said track center.

13. A method of controlling off-track errors in a linear tape data storage system, the method comprising:
providing a tape having a length and a transverse width, moving said tape longitudinally at a base tape speed, and winding said tape on a spool;
writing data longitudinally with a writing head onto the tape along a longitudinal track while the tape is moving longitudinally at the base tape speed;
sensing transverse position of the writing head relative to a center of the longitudinal track;
setting off-track limits on both sides of said center and setting off-center limits on both sides of said center, wherein the off-center limits are between the off-track limits and the center; and
wherein said winding the tape on the spool comprises winding inconsistencies that move the tape transversely relative to the writing head; and
wherein, when said winding inconsistencies move the tape transversely to an extent wherein the writing head reaches the off-center limit on either side of said center, the method further comprises reducing tape speed below the base tape speed to lessen transverse movement of the tape caused by said winding inconsistencies; and
wherein, when said tape moves transversely to an extent wherein the writing head reaches the off-track limits on either side of the center, the method further comprises stopping writing of data on the tape.

14. A method as in claim 13, wherein said winding inconsistencies comprise the tape impacting a flange of the spool.

15. A method as in claim 13, wherein said winding inconsistencies comprise the tape being wound over a bump in tape on the spool.

16. A method as in claim 13, comprising a period of writing operation wherein said winding inconsistencies cause transverse movement of the tape once every revolution of the spool.

* * * * *